Patented Nov. 29, 1927.

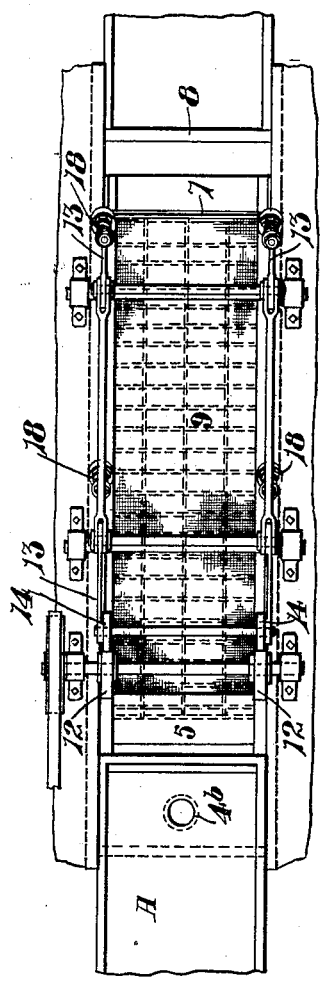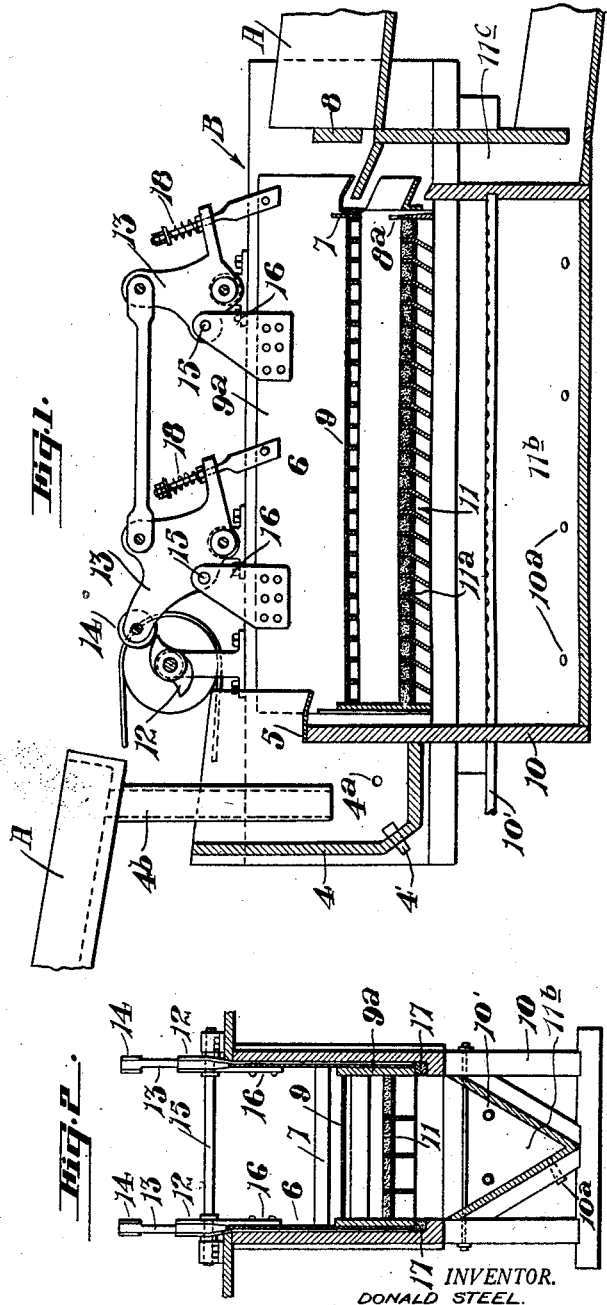

1,651,046

UNITED STATES PATENT OFFICE.

DONALD STEEL, OF JARBIDGE, NEVADA.

DREDGE SLUICE JIG.

Application filed January 3, 1923. Serial No. 610,432.

This invention relates to a concentrating apparatus and especially to a combined jig and concentrator, particularly adapted for operation on dredges and in other adaptations.

The object of the invention is to provide a combined concentrator and jig which is compact in construction and so designed as to save valuable space and head room, especially on a dredge, and to relieve the hull of the dredge of a great weight of sluices and riffles for saving values; to provide a multiple screen jig provided with mobile mats which are held against shifting when subjected to various swaying motions of the dredge; to provide a concentrator combined with a source of supply having means for checking the rush of water and solids, thereby preventing scouring of the concentrator, and furthermore affording a preliminary trap whereby large and heavy objects, such as stones and pieces of iron, are trapped, and it also serves as a check to gently feed the material into compartments which follow; and further to provide novel means for transmitting an agitating movement to the sand in the jig compartment, and simultaneously a movement which will serve to advance the waste material over the concentrating screens. Other objects will hereinafter appear.

One form which my invention may assume is exemplified in the following description and illustrated in the accompanying drawings, in which—

Fig. 1 is a central vertical longitudinal section of the sluice jig,

Fig. 2 is a central vertical cross-section of the sluice jig.

Fig. 3 is a plan view of the sluice jig.

Referring to the drawings in detail and particularly to Fig. 2, A indicates the sluice of a dredge and B the jig box. This box is placed in line with the sluice and transversely of the same. The jig comprises a preliminary box or trap 4, which is dropped below the bottom of the sluice A, and it is provided with a forward wall 5 which forms one side of a jig compartment or chamber 6. The water and solids rushing down the sluice are delivered to the trap 4 and the chamber 6 by a pipe 4ᵇ. The latter chamber is provided with an adjustable dam 7 over which the discharge takes place. The sluice A continues at the opposite end of the box B, as shown at 8, and is provided with an adjustable gate 8ᵃ which cooperates with the dam 7. The dam 7 regulates the depth of solids which may collect upon a screen generally indicated at 9 and the gate 8ᵃ regulates the head of water maintained above the screen, said screen forming a floor for the chamber 6. The solids trapped in the box 4 may be removed as occasion requires through a discharge spout 4' and clear water may be admitted to the trap through means of a feed pipe 4ᵃ. Arranged below the chamber 6 is a jig box 10. This jig box forms a support for the jig tray containing screen 9 and also a lower screen generally indicated at 11. The upper screen or that indicated at 9 is provided with an adjustable dam 7 as already stated, and the lower screen is similarly provided with an adjustable dam which regulates the amount of solids permitted to collect thereon. The dam 7 in each instance represents the discharge side of the respective screens and the opposite end is the delivery or feed side thereof.

To render this apparatus especially adaptable for service on dredges in which case the grade is constantly varied with the movement of the dredge, I provide a series of transverse bars as indicated at 11ᵃ. These bars form pockets which are filled with coarse concentrates or other suitable material which forms a mat of desired weight and depth, the depth of the mat being controlled by the height of the bars 11ᵃ. The pockets or partitions formed retain the mat from drifting or shifting from side to side with relation to the screens when the dredge is rocking or swinging, and uniform results may, therefore, be maintained under all conditions.

The jig box B terminates in a V-shaped bottom generally indicated at 10, see Figs. 2 and 3. Water is admitted to the box at a point below the screen 11 by means of perforated pipes such as indicated at 10'. This water passes upwardly through the screens and carries away slime and like material, while the concentrates passing through the screens settle down between the inclined bottom sections 10 and are removed from time to time through taps indicated at 10ᵃ. As previously stated the screens 9 and 11 are supported by the jig tray, which consists of connected side sections 9ᵃ. The screens are given a reciprocating motion first upward and forward, and then downward and backward by means of cams 12 and rocker arms 13. The cams 12 when rotating engage the rollers 14 which causes the rocker arms to swing a short distance about shafts 15 as an axis. The rocker arms are pivotally connected to lugs 16 which in turn are attached to the side sections 9ª which support the screens, and as the cams are continuously revolving, it can be readily seen that a movement is imparted first in an upward and a forward direction, and then in a downward and back direction when the cams release the rollers 14. The rockers are checked during their return movement by a buffer 17 and springs 18 which impart a certain amount of jar at the end of each stroke, this jar being important as it materially improves the concentrating action.

The operation of the apparatus is as follows:

Having placed upon the screen 11 a mat of heavy concentrates or other suitable material, and having filled the jig box with water and turned on water through the several feed pipes indicated, it is only necessary to impart a reciprocal movement to the screens to set the jig in full operation. The material from the sluice A ordinarily moves at a very high speed and the ratio of solids to water is comparatively small. This speed results in scouring any unprotected surface of the screen or like obstacle but is avoided in this instance as the rush of water is first checked by the trap 4, and secondly by the gate 8ª. Scouring action is further avoided as a fairly heavy mat of concentrates or the like is maintained on the surface of the screen 9 by means of the dam 7. As the rush of water is checked, it is obvious that precipitation of solids will take place, the heavier solids being caught in the trap 4 and the lighter material settling down in the surface of the mat maintained above the screen 9. As this and the screen below are constantly vibrated or moved upward or forward they carry the gravel and ore upwardly and forwardly, and as the screens fall or travel back they allow the gravel and ore to drop vertically through the water to a point on the screen in advance of the point of beginning. By this action the material is carried or moved mechanically across the screen to the discharge end. The heavier particles settle faster than the lighter and all particles that are finer than the screen 9 will gradually pass through with the fine sands to the screen 11; here, the heavy particles pass through the mat and the screen 11, but the finer sands will not pass through as the upwardly flowing current of water supplied by the perforated pipes 10' checks or prevents the passage of the finer sands. These sands will, therefore, gradually work towards the dam 8ª and will discharge into the chamber 11ᶜ. Any heavy particles too large to pass the screen 9 and not heavy enough to be caught in the trap 4 will collect behind the dam 7 from whence they may be removed by means of a scoop or in any other manner desired; the principal function of the screen 9 is to prevent the coarse material from mixing with the mat maintained above the screen 11 as such coarse material would ultimately displace the mat or destroy its function as a screening and concentrating medium.

From the foregoing it can be seen that certain heavy material is collected behind the upper dam 7 and that the finest heavy material passes through the screens 9 and 11 and is finally collected in the hutch indicated at 11ᵇ. No sands or slimes will enter the hutch due to the counter-current established by the incoming feed water delivered by the pipes 10' and such sands as pass through the screen 9 will, therefore, discharge over the lower dam 8ª and enter the passage 11ᶜ. Other fine material, such as slimes, mud, etc., is maintained in suspension by the agitating movement of the jig tray and the screens carried thereby and as such will not settle but flow through the chamber 6 and out through the sluice 8. The destruction of the mat or displacement of the mat maintained above the screen 11 is prevented by providing the cross bars 11ª and the mechanical advance of all material to be discharged is taken care of by the vibrating movement imparted. It will, therefore, be seen that I have produced a combined jig and sluice which will effectively treat placer material on a dredge. Further, that this jig is so constructed as to require a minimum of space in proportion to the screening area afforded, and, as it is set low, head room is also reduced. This will also displace many heavy sluices and reduce the necessary size of hull to secure flotation.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. An apparatus of the character described comprising a jig box, a sluice connected to each end of the box, one sluice forming a delivery and one a discharge, means in the delivery sluice for breaking the force of the water and solids delivered to the jig so that the water and solids will be gently delivered thereto, an adjustable gate in the discharge sluice regulating the height of water maintained in the jig box and also maintaining the water in a comparatively quiet condition, a vibrating jig within the box, a plurality of interspaced screens disposed directly above each other and supported by the vibrating jig, an adjustable dam on each screen to regulate the height of solids maintained thereby and forming, a discharge dam on each screen, the uppermost dam being in substantial alignment with the discharge of the sluice and discharging into the same, a second discharge sluice disposed below the first named discharge sluice, a discharge spout on the lowermost screen and adapted to discharge into the lowermost sluice, and a discharge connection below the lowermost screen and permitting the water below the screens in the jig box to discharge therethrough and into the lowermost sluice.

2. An apparatus of the character described comprising a jig box, an inlet sluice connected with one end of the jig box, a discharge sluice connected with the opposite end thereof, a second discharge sluice disposed below the first named discharge sluice, a pair of superposed vibrating jig screens within the box one in alignment with the inlet and first named discharge sluice and a second disposed below the same, a discharge spout on the uppermost screen adapted to discharge into the uppermost discharge sluice, a discharge spout on the lowermost screen adapted to discharge into the lower discharge sluice, a third discharge in communication with the interior of the box and the lowermost discharge sluice and disposed below the lowermost screen, means for delivering a pulsating current of water to the box below the lowermost screen, said water adapted to discharge partially upwardly through the screens and partially through the lowermost discharge connection.

DONALD STEEL.